United States Patent [19]

Recoque

[11] 3,768,076

[45] Oct. 23, 1973

[54] MULTIPLE PERIPHERAL COUPLED DATA PROCESSOR SYSTEM

[75] Inventor: Alice Maria Recoque, Chatenet-Malabry, France

[73] Assignee: Compagnie International pour L'Informatique, Louveciennes, France

[22] Filed: Apr. 12, 1972

[21] Appl. No.: 243,301

[30] Foreign Application Priority Data

May 7, 1971 France .............................. 7116498

[52] U.S. Cl. .............................................. 340/172.5
[51] Int. Cl. ................................................ G06f 9/18
[58] Field of Search .................................. 340/172.5

[56] References Cited

UNITED STATES PATENTS 3,651,482 3/1972 Benson et al. ................... 340/172.5

*Primary Examiner*—Raulfe B. Zache
*Attorney*—Solon B. Kemon et al.

[57] ABSTRACT

A digital data processor which receives instruction and operand words from an external store, operates on such words by execution of internal micro-instruction programmes and communicates with a plurality of peripheral units through a multi-coupling arrangement, comprises means executing the specific operations controlling exchanges between the processor and the peripheral units and the coupling units of the peripheral units comprise only means for the local control of operation of said peripheral units.

7 Claims, 1 Drawing Figure

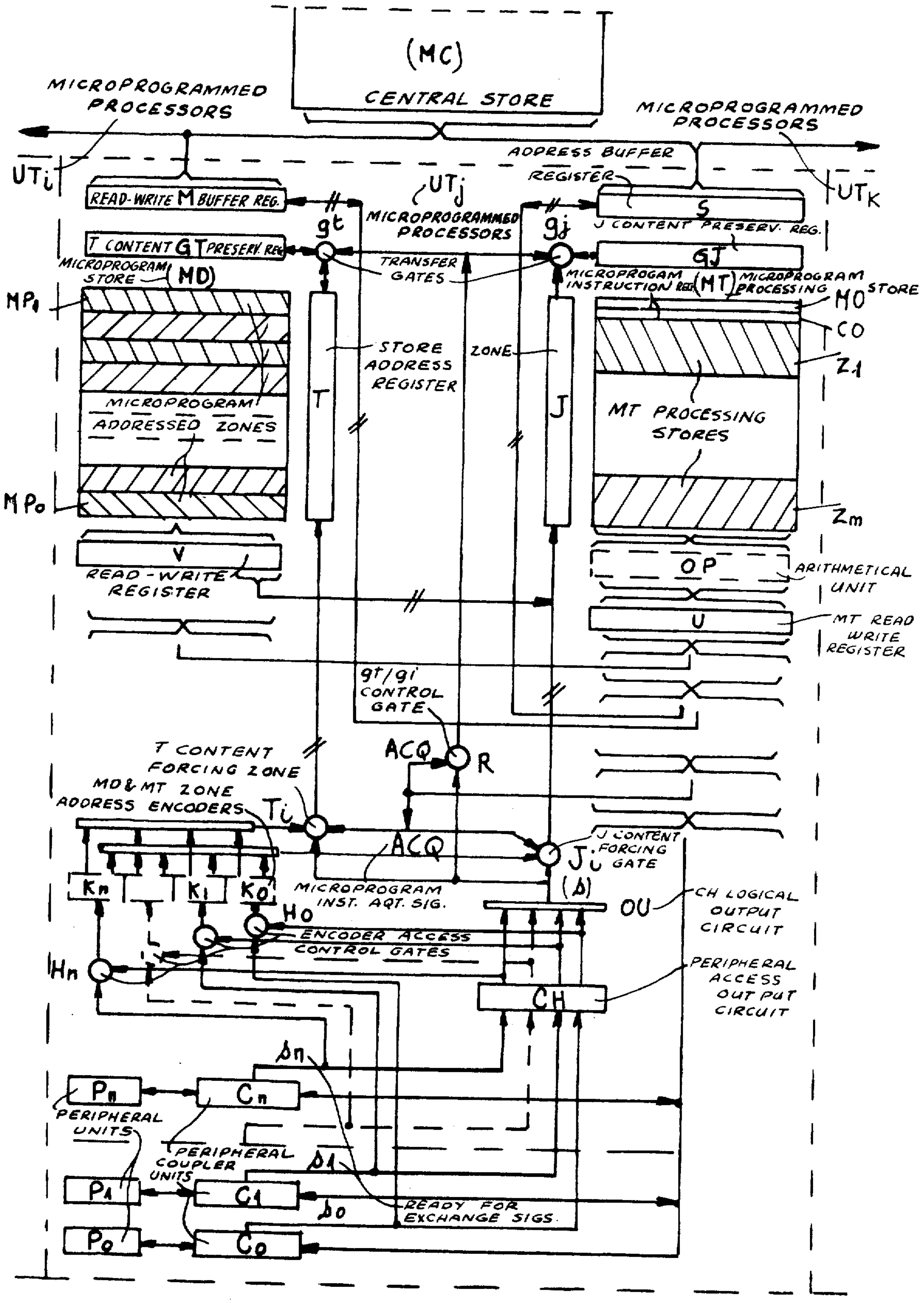
(MC)
CENTRAL STORE
MICROPROGRAMMED PROCESSORS
MICROPROGRAMMED PROCESSORS
ADDRESS BUFFER REGISTER
UT$_i$
UT$_j$
UT$_K$
READ-WRITE M BUFFER REG.
MICROPROGRAMMED PROCESSORS
S
J CONTENT PRESERV. REG.
T CONTENT GT PRESERV. REG.
gt
gj
GJ
TRANSFER GATES
MICROPROGRAM STORE (MD)
MICROPROGAM INSTRUCTION REG. (MT) MICROPROGRAM PROCESSING STORE
MO
CO
Z1
MP1
STORE ADDRESS REGISTER
ZONE
T
J
MICROPROGRAM ADDRESSED ZONES
MT PROCESSING STORES
MPo
Zm
V
READ-WRITE REGISTER
OP
ARITHMETICAL UNIT
U
MT READ WRITE REGISTER
gt/gi CONTROL GATE
ACQ
R
T CONTENT FORCING ZONE
MD & MT ZONE ADDRESS ENCODERS
Ti
ACQ
J CONTENT FORCING GATE
Ju
Kn
K1
Ko
MICROPROGRAM INST. AQT. SIG.
(Δ)
OU
CH LOGICAL OUTPUT CIRCUIT
Ho
ENCODER ACCESS CONTROL GATES
Hn
CH
PERIPHERAL ACCESS OUTPUT CIRCUIT
Δn
Pn
Cn
PERIPHERAL UNITS
PERIPHERAL COUPLER UNITS
Δ1
P1
C1
Δo
READY FOR EXCHANGE SIGS.
Po
Co

MULTIPLE PERIPHERAL COUPLED DATA PROCESSOR SYSTEM

BRIEF SUMMARY OF THE INVENTION

The present invention is concerned with the problem of multiple coupling of peripheral units with a digital data processor which is organized as a microprogrammed machine comprising the combination of:

a micro-instruction word zone organized control store wherein micro-instruction program are stored and from which micro-instruction words may be read when a programme instruction fed to the processor from an external store must be decomposed and executed, a word processing store made of a plurality of word registers, nearly all of which are banalized and only receive appropriations according to the execution of a task defined by the instruction word from said external store; such appropriations being for instance transfer, processing, base, word micro-instruction storing, accumulation and others useful for the execution of the micro-programmes and the exchanges between the processor and its environmental equipment, i.e. the said external store and the said peripheral units, an arithmetical unit which more often consists of an adder-subtractor circuit having conventional imparity, overflow and other test circuits associated therewoth, word exchange means between the control store and the precessing store and between said stores and at least one such external store, and, exchange means between the processing store and the said peripheral units.

The external store capable of supplying instruction and operand words to the processor and to receive information words from the processor may be the central store of a computer unit of which the processor is a part or the central store of a multi-processor system in which at least one of the processors is a computer unit.

Usually, access to a peripheral unit is provided through a coupling unit which is external to the processor and which is provided for execution of instructions from said processor. These instructions are banalized. They may be quite simple for exchanges concerning a single word but they also may be quite complex when, for instance, they must concern exchanges involving the content of a complete zone of a store, the length of which is dynamically defined and varied during an exchange operation. Consequently such a coupling unit usually comprises, in addition to a circuit arrangement directly adapted to operate the peripheral unit proper, a further circuit arrangement capable of executing program instructions though said instructions are not significant of the nature of the peripheral unit to which said coupling circuits are appended.

It is the object of the invention to provide a processor organized as a microprogrammed machine and having exchange capabilities with a plurality of peripheral units so that it assumes all the coupling functions for said peripheral units. While increasing the efficiency of the processor, the coupling units for the peripherals are each restricted to the specific operation control circuit adapted to the nature of the peripheral unit proper.

BRIEF DESCRIPTION OF THE DRAWINGS

The single FIGURE of the drawings shows one embodiment of a processor according to the present inveniton. Any technological modification within the field of the invention will be apparent from the following detailed description.

DETAILED DESCRIPTION

The example relates to a system comprising a central store (MC) and a plurality of processor units, ..., $UT_i$, $UT_j$, $UT_k$, ... and the processor $UT_j$ is detailed. Said central store (MC) must be understood as capable of delivering instruction and operand words to the processor units in accordance with the progression of at least one programme executed by a central unit, or computer, not shown as not a part of the invention proper.

The processor $UT_j$ is a micro-instruction operated processor and the peripheral units associated with it are shown from Po with Pn, each peripheral unit being associated to a coupling unit Co to Cn.

The processor $UT_j$ first includes a micro-instruction control store (MD) storing the useful micro-programmes in zones MPl to MPq. Said store (MD) is provided with a read-write register V and a zone address register T which enables the selection of the micro-programmes in said store. The processor further comprises a word processing store (MT) which is also organized in zones Zl to Zm, which may be selected from the content of a zone address register J, the read-write register of (MT) being shown at U. An arithmetical unit OP is shown interposed between the store (MT) proper and the read-write register U. Said arithmetical unit may comprise, as is conventional an adder-subtractor circuit equiped with imparity, overflow and other test facilities. If desired, OP may be located under the read-write register U. However, the shown location is of advantage in that, from U, direct access to the information output of the peripherals as well as to the information input to these peripheral units. (MT) is made of banalized register, not having fixed and predetermined appropriations for the operation of the processor, with the possible exception of two of them, shown at MO and CO. Appropriations of the registers, zone per zone, will be controlled in accordance with the micro-programmes selected from (MD). Each micro-programme selected in (MD) first defines the zone Z where the task will be executed:- in each zone Z, when desired, one of the registers may be allotted to the sequence switch performance and another one to the instruction-word memory function, the other registers of the zone being allotted transfer, base, exchange and other useful and conventional functions. However, it seems preferable in certain cases, to preserve in (MT) two registers, i.e. MO and CO, for performing for each task the functions of instruction-word memory and sequence switch control.

During any task, interruption may occur, as known. GT is a register enabling the preservation of the content of T when such an interruption occurs and, similarly, GJ is a register enabling in such an occurrence the preservation of the content of J. Said registers GT and GJ are shown distinct from the registers of the store (MD) and (MT) for the sake of clarity but, of course, they may consist of registers in said stores. It will understood that further registers may be attributed to the preservation of other data when an interruption occurs, for instance for the preservation of the content of the read-write register U as it may contain an intermediate result or a yet unused instruction or data word.

M is a register to which the central store (MC) accesses and the same is true for the register S. Actually, the register M is a read-write register for the central store (MC) and the register S is an address register for the central store (MC). However both said registers M and S are provided within each one of the processors of the system. Each time a word obtained from execution of a task in the processor must be transferred to (MC), said word is introduced into M and an address is correspondingly introduced in S. Each time, the central store (MC) must give an instruction to the processor, this instruction is introduced into M. The provision of such registers as M and S within each processor introduces a kind of buffer effect in the operation of the central store and, of course, the central computer unit of the system. In a conventional multi-processor and central store system, only one read-write register and only one select address register are associated with the central store, which was a delaying and time consuming factor since, once an instruction word from the store is introduced into the read-write register, said register was unavailable until the processor to which it was due actually called it. During this delay, there was no possibility for the central store to deliver a word to another processor or receive a word from another processor. Conversely, for placing a word into the central store, a processor had to wait for the availability of both the read-write and the select address register of the central store. Both these drawbacks are avoided in a system embodying processors according to the present invention:- a word may be introduced into the register M of a processor where it may wait for the internal use of said processor and the central store may supply other processors with other words. A word in such a "buffer" register as M will wait until a micro-instruction from (MD) calls it for use and, conversely, when a word in such a "buffer" register M is introduced therein from the processor organization, it will wait for the availability of the access to the central store, as well as the address then contained in the other "buffer" register S. Usually, the central store address of a word is part of, or derived from, the instruction word which has been previously introduced into M from the central store (MC) for execution in said processor and it is this address which will be transferred to S during or at the end of said execution for the transfer into (MC) of a result of a task executed according to the said instruction in the processor.

Various interconnections are further indicated in the drawings between (MD) and (MT), such interconnections being activated during execution of a task as the micro-instructions are considered and executed in a micro-programme:- said interconnections mainly concern the transfers from V to U and back. Two-way interconnections are also shown to exist between U and the coupling units Co to Cn.

In a system according to the invention, each coupling unit comprises only the circuits controlling extraction from and introduction of data from into the peripheral unit with which it is associated and does not include any interpretative organization of the instructions as the processor contains and executes any and all coupling micro-programmes for such exchange instructions. Of course, such coupling units normally include the conventional means for synchronization between the peripheral units and the processor as well as the conventional suspensive logic. Such a coupling unit will further include, for magnetic tapes, the conventional buffer word register and for the high speed peripheral units such as magnetic disks and drums, the series-parallel and parallel-series converters of the codes to write into and read from the disk or drum. For disks and drums further, the reduced coupling units may also comprise the circuits selecting the locations of the words to read or write but, most often however, the processor will include such micro-programmes in this respect that will avoid the necessity of such selection circuits in the coupling units proper selection controls in this respect issuing directly from the register U of (MT). Actually, no detailed description of such coupling units is necessary. It suffices to consider that, in a conventional fashion, when a peripheral unit is called from (MT) and when, according to the invention, the coupling unit has received from (MT) the useful information, said coupling unit, after activating the peripheral unit, issues a signal indicating that the exchange defined by the processor may occur. Such issuance of signals is also conventional per se but the processing and action of such signals are, according to the invention, provided in a special way, as being applied to the following organization:

Each one of the signals so to sn is applied to an encoder Ko to Kn and each encoder, when activated, delivers two coded signals $T_i$ and $J_i$ for initialization of the address registers T and J of the stores (MD) and (MT) of the processor. The forced introduction of such codes into T and J produces interruption of the task in the processor but they are only introduced into the registers T and J through gates $T_i$ and $J_i$ which only pass them when a signal ACQ is applied to them. This signal occurs each time a micro-instruction has been executed in the processor and, for instance, comes from the register U of (MT). The said ACQ signal controls the preservation of the context of the task in the processor, through a gate R, when at least one of the signals sp to sn exists. In this respect, all the outputs of the coupling units Co to Cn delivering such signals are united at OU for forming a signal (s) which is applied as an authorization signal to the gates $T_i$ , $J_i$ and R. When R is made conductive, the ACQ signal controls gates such as gt and gj in their conducting conditions so that the content of T may be introduced into the register GT and the content of J into the register GJ. The other data of the context of the task will be similarly preserved by their introduction into appropriate registers of (MT) under the control of the signal issuing from R though for the sake of clarity of the drawing, the control connections proper had not been shown.

Whereas such an organization, as presently described, produces an interruption for each one of the signals so to sn issued by the coupling units Co to Cn, the interruption becoming effective as soon as an ACQ signal appears, it is still incomplete because cases exist for which immediate interruption is not permissible:- when an exchange must concern a complete memory zone, such an exchange needs repetitive operative exchange cycles the occurrence of which cannot be interrupted (magnetic tape or disk or drum peripheral units for instance). Some kind of hierarchy must consequently be established of the accessiblity of the peripheral units to the processor unit proper. All the outputs from so to sn of the peripheral coupling units are applied to an access hierarchy control circuit CH the outputs of which individually control as many gates Ho to Hn which are inserted between the outputs of the signals so to sn of the units Co to Cn and the inputs of the encoders Ko to Kn. Actually, the outputs from CH are united at OU for the above described control of the gates $T_t$, $J_t$ and R. The circuit CH is such that when two signals s coincide or coexist, any one of the s signals dissapears only when the exchange it has initiated is completed or, alternatively, when one of the s signals being memorized in CH in a two-condition member thereof, a single one of its outputs be activated, corresponding to the input of the higher relative rank in a predetermined hierarchy of the peripheral units. The structure of CH will be obvious:- the circuit comprises as many gates as are s outputs from the coupling units except one, of the highest priority rank, which is directly connected to an output of the circuit. Each of said gates is inhibited by the activated outputs s of higher priority ranks and has its output connected to OU and the corresponding gate H. Considering as an illustration, that the priority ranks are defined by the indices, when the signal sn is "true", it produces inhibition of all the gates of CH, when said signal sn is "false" but the signal s'n−1) is "true," it inhibits all the gates receiving the signals s(n−2) down to so, and so forth.

In order better to define the organization and operation of the processor, an illustrative example will now be fully detailed:- exchange operation between such a peripheral unit as a magnetic drum the content of a sector of which must be read for transfer to the central store (MC) and said central store through the processor $UT_j$.

In this respect, an instruction from (MC) is introduced into the register M for initializing, in a zone of (MT) two transfer registers with two data:- a count of words to be read from the disk and the address of (MC) to which said data must be transferred. Both data are contained in the said instruction.

When such an instruction is introduced into M while the processor operates on another task, which will be the normal case, the instruction will wait in M until such time as (MD) ends a micro-programme or a part of a micro-programme at which an interruption is permissible. The instruction in M is then taken into account and in (MD) a micro-program is executed for decomposition of the instruction and initialization of a zone Z of (MT) which is from this instant allotted to the exchange operation defined by the said instruction. Initialization comprises charging into a register MO of said zone Z (or in the register MO as shown) the instruction code proper and in a register of said zone, the address of (MC) in the instruction, plus the initialization of a register CO, for controlling the sequence of operation in the micro-programme concerned with the exchange. Further the address of the sector of the disk from which the data must be read is placed in the register U. Such an address may be contained in the instruction from (MC) but, in most cases, will be contained in a further instruction from (MC) which will be called by the processor after the said initialization period. The coupling unit receives this address from the register U and acts for preparing the transfer by decoding it and selecting therefrom the concerned sector of the disk. It is assumed that the coupling unit still comprises a local address decoding arrangement in addition to the routing organization of the words read out from the disk. The *s* output signal is then generated from a comparator of the local address code applied to the coupling unit from U and a read-out address code of the disk. When the coupling unit does not include such a local address decoding arrangement, the selection will depend on the execution of a mico-programme executed by the processor in this respect and the signal *s* is supplied only when the coupling unit will have conditioned the local routing gates for the read-out, under the control of the processor.

The coupling unit issues its signal s and, provided this signal is of a higher priority rank than the signal s which initiated the operation of the processor for the task it is executing, when the micro-instruction is acquitted in the processor, pertaining to this former task, the codes $T_t$ and $J_t$ will be substituted for the former such codes in the registers T and J, the context of the interrupted task being preserved as previously described. It may be noted that, instead of providing this preservation directly from the issuance of a signal from the gate R, it might be made by controlling from the signal (s) issuing from the circuit OU an encoder the code of which will call for a specific context preservation micro-instruction existing in (MD), the gates $T_t$ and $G_t$ being in such a case rendered conductive only by the signal of acquitment of such a specific micro-instruction. Of course, gate R may be used for activating such an encoder.

Once the signal s taken into due account by the processor, the address code MP of the exchange micro-programme is introduced into the register T and the address code of the zone Z is introduced in the register J. The micro-programme is executed in accordance with the normal internal operation of the processor, which does not need any detailed explanation as being conventional per se:- a word is read on the coupling unit and transferred to U, from which it is transferred to M and transferred to a location of (MC) defined by the content of S; thereafter the address in S is increased by one unit and the count of the number of words is decreased by one unit in the register which has been initialized with such count, a second word is read on the coupling unit, transferred to U, and so forth up to a zero count of the number of words. At the end of the micro-programme, an instruction is transmitted to the coupling unit, through the register U, for de-activating the said coupling unit and an ACQ signal is applied to $T_t$, $J_t$ and R. The interupted programme may be resumed, the data of its context when interrupted being automatically called back to their appropriate location from execution of a final instruction of the executed micro-programme following the acquitment instruction.

What is claimed is:

1. A digital data processing system for exchange operations between an external instruction and operand word external store and a plurality of peripheral units each of which is provided with a coupling unit for controlling the local operation thereof, generating a signal on an output thereof each time the controlled peripheral unit is ready for an exchange and routing information to and from the said peripheral unit during an exchange operation, wherein such exchange operations are made through and controlled from a microprogrammed processor having external store word and address accesses and coupling unit addressable accesses from a read-write register of a zone organized microprogram processing store and arithmetical unit thereof, said microprogram processing store including a zone address register and said microprogrammed processor further comprising a zone organized microprogram store including interpretative peripheral coupling function micro-instructions in addressed zones thereof, a zone address register and a read-write register in said microprogram store, and wherein the microprogrammed processor comprises as many exchange microprogram zone address code forming circuits and as many exchange microprogram processing zone address code forming circuits as are coupling units, each such address code forming circuit being activable from the ready-for-exchange signal from a coupling unit, a logical OR circuit of the ready-for-exchange signals from the coupling units, first and second gate circuits activable from the output of the said logical OR circuit having respective outputs connected to forcing inputs of the zone address registers of the microprogram store and of the microprogram processing store, said first gate circuit having an input connected to the outputs of the exchange microprogram zone address code forming circuits and said second gate circuit having an input connected to the outputs of the exchange microprogram processing zone address code forming circuits.

2. System according to claim 1, wherein a micro-instruction acquitment signal being conventionally generated in the microprogrammed processor at each termination of execution of a micro-instruction, said first and second gate circuits are provided with an activation input to which such an acquitment signal is applied.

3. System according to claim 1, wherein the ready-for-exchange signals from the coupling units are applied to a peripheral hierarchized priority defining circuit, the outputs of which are applied to the inputs of the said logical OR circuit and gates individually controlled from the outputs of the said peripheral hierarchized priority defining circuits are applied to as many gates in the activation inputs of the said address code forming circuits.

4. System according to claim 2, wherein a gate circuit receives the output signal from said logical OR circuit and the said acquitment signal and has its output connected to means transferring the context of an interrupted task of the microprogrammed processor to memorization locations thereof prior to activation of the said first and second gate circuits.

5. Digital data processor according to claim 1, wherein said microprogrammed machine comprises a first word buffer register and a second word buffer register respectively interposed between the instruction and operand word access to the external store and the micro-programme store and between the external store address access to the external store and the processing store of the micro-programmed machine of the processor.

6. A digital data processing system for exchange operations between an instruction word and operand store and a plurality of peripheral units each of which is associated with coupling units, through a processor organized as a microprogrammed machine having microprogram zone organized store including a zone address register, microprogram processing zone organized store including a zone address register and a read-write register association with an arithmetical unit, each coupling unit delivering a ready-for-exchange condition signal when its peripheral unit is in such a condition, wherein said microprogrammed machine processor comprises word buffer access and address buffer access to the store and addressable accesses to the coupling units from the read-write register and an exchange control organization activated from the ready-for-exchange signals from the coupling units, forming exchange microprogram and microprogram processing zone address codes and forcing said codes into the corresponding zone address registers and of the microprogram store and the microprogram processing store.

7. A digital data processing system comprising the combination of a central instruction and operand store and a plurality of multiple peripheral coupled processor units each of which is organized as a microprogrammed machine for execution of the instructions from said central store and each of which further comprises means executing the coupling functions useful for establishing exchange operations between said peripheral units and said central store by the said microprogrammed machine.

* * * * *